(12) United States Patent
Dhawan

(10) Patent No.: US 10,617,913 B2
(45) Date of Patent: Apr. 14, 2020

(54) TRAINING SYSTEM FOR AN E-BIKE

(71) Applicant: Rakesh K Dhawan, Ashburn, VA (US)

(72) Inventor: Rakesh K Dhawan, Ashburn, VA (US)

(73) Assignee: FALCO eMotors Inc, Dulles, VA (US)

( * ) Notice: Subject to any disclaimer, the term of this patent is extended or adjusted under 35 U.S.C. 154(b) by 12 days.

(21) Appl. No.: 15/841,026

(22) Filed: Dec. 13, 2017

(65) Prior Publication Data

US 2018/0161627 A1 Jun. 14, 2018

Related U.S. Application Data

(60) Provisional application No. 62/434,271, filed on Dec. 14, 2016.

(51) Int. Cl.
*A63B 24/00* (2006.01)
*A63B 71/06* (2006.01)
(Continued)

(52) U.S. Cl.
CPC ...... *A63B 24/0075* (2013.01); *A63B 21/0053* (2013.01); *A63B 24/0087* (2013.01);
(Continued)

(58) Field of Classification Search
None
See application file for complete search history.

(56) References Cited

U.S. PATENT DOCUMENTS

| 6,126,571 A * | 10/2000 | Parks | A63B 69/16 434/247 |
| 2012/0178592 A1* | 7/2012 | Chieh | B62H 1/04 482/57 |

(Continued)

*Primary Examiner* — Sundhara M Ganesan

(57) ABSTRACT

Disclosed is a training system for providing fitness training to a user riding an e-bike. The training system includes a motor system attached to a rear wheel of the e-bike and a detachable training stand for raising the rear wheel from the ground to allow the user to ride in various terrain modes from a stationary position. The motor system includes a stator assembly, a rotor assembly, an axle, a memory unit configured in the stator assembly to store set of instructions and plurality of terrain modes for riding the e-bike, and a bi-directional communication unit attached to the stator assembly for receiving terrain modes and other commands over the communication network. The motor system further includes a processing unit coupled to the memory unit and configured in the stator assembly for processing the set of instructions to: receive the terrain mode for setting the motor system over the communication network through the bi-directional communication unit in real time and change the motor quadrant of operation in the real time depending upon the received terrain mode. The motor system further includes a free-hub assembly attached to the rotor assembly, a free-hub spacer rotates proportionally with the pedaling speed of the user, free-hub produces a pattern for sensing pedaling speed and pedaling direction and a magnetic sensor configured on the axle for processing the pattern of pedaling speed and pedaling direction received from the free-hub magnets. The processing unit processes the information from the magnetic sensor to derive the power generated by the user during pedaling.

20 Claims, 4 Drawing Sheets

(51) Int. Cl.

| | | |
|---|---|---|
| *A63F 13/803* | (2014.01) | |
| *A63F 13/85* | (2014.01) | |
| *B62M 6/65* | (2010.01) | |
| *B62M 6/45* | (2010.01) | |
| *B62J 99/00* | (2020.01) | |
| *B62H 7/00* | (2006.01) | |
| *A63B 69/16* | (2006.01) | |
| *A63B 21/005* | (2006.01) | |
| *A63B 23/04* | (2006.01) | |
| *A63F 13/245* | (2014.01) | |
| *A63F 13/42* | (2014.01) | |
| *A63F 13/98* | (2014.01) | |

(52) U.S. Cl.
CPC ............ *A63B 69/16* (2013.01); *A63B 71/06* (2013.01); *A63B 71/0622* (2013.01); *A63F 13/245* (2014.09); *A63F 13/42* (2014.09); *A63F 13/803* (2014.09); *A63F 13/85* (2014.09); *A63F 13/98* (2014.09); *B62H 7/00* (2013.01); *B62J 99/00* (2013.01); *B62M 6/45* (2013.01); *B62M 6/65* (2013.01); *A63B 21/0058* (2013.01); *A63B 23/0476* (2013.01); *A63B 24/0062* (2013.01); *A63B 2024/009* (2013.01); *A63B 2024/0096* (2013.01); *A63B 2069/165* (2013.01); *A63B 2071/0638* (2013.01); *A63B 2071/0644* (2013.01); *A63B 2220/36* (2013.01); *A63B 2220/54* (2013.01); *A63B 2220/89* (2013.01); *A63B 2225/20* (2013.01); *A63B 2225/50* (2013.01); *A63B 2225/54* (2013.01); *A63F 2300/8082* (2013.01); *B62J 2099/004* (2013.01); *B62J 2099/0013* (2013.01)

(56) References Cited

U.S. PATENT DOCUMENTS

2014/0171266 A1* 6/2014 Hawkins, III ..... A63B 24/0087
    482/5
2016/0243927 A1* 8/2016 Biderman ............ B60K 7/0007

* cited by examiner

TRAINING SYSTEM FOR AN E-BIKE

CROSS REFERENCE TO RELATED APPLICATION

This application claims priority to U.S. Provisional Application No. 62/434,271 filed on Dec. 14, 2016, the entireties of which are incorporated herein by reference.

BACKGROUND OF THE INVENTION

1. Field of the Invention

The present invention generally relates to a training system, and more particularly relates to a training system having a brushless gearless motor system an e-bike.

2. Description of Related Art

As our lives have become increasingly short of time, indoor exercise has become a need with increasingly demanding requirements. There are several trainers available in the market which can be easily adapted to retrofit an existing bicycle. Nowadays, smart trainers are also available to be actively controlled by third party apps and programs adding more value to the product use. Bicycle trainers are available from simple resistance control to extensive and adaptive resistance control including the simulation of the road feel.

A conventional stationary bicycle exercise device is well known in the industry. The bicycle includes a pair of stands. One for each end of a conventional bicycle, used to support the bicycle and a rider in an upright position. As so supported, the rear drive wheel of the bicycle is free-turning. The bicycle could be "ridden" in a stationary location to gain exercise.

However, to increase the pedaling resistance provided by the bicycle, many devices have been used comprising of fluid based resistance to magnetic resistance to electromagnetic resistance etc. Accordingly, the pedaling resistance experienced by the rider is increased by several means as the wheel spins.

With a bicycle exerciser, today, the user of the device must install sometimes both the front and the rear of the bicycle onto the stands, and other times, just the rear of the bicycle on to the stand. This installation process involves removing the conventional rear wheel and attaching the rear end to the stationary stand, and is quite time consuming. For example, to attach the stand to the bicycle frame one must pay careful attention to the conventional rear wheel removal process as the wheel may have disc brake on one side and 10-speed chain sprocket on the other side.

Further, removal of such a wheel can cause injury and at times damage the wheel and the frame. The conventional bicycle rear wheel is not quick to install, and is equally time consuming to remove. Most bicyclists are willing to simply leave the rear wheel on the bicycle when it is being ridden indoors on a simulated road, track, or trail because of the extra hassle, and the great premium in convenience and saving time if such a system could be built inside the rear wheel.

These stationary trainers generally include a folding frame or stand, which in its use configuration secures the bicycle by clamping to opposite ends of the rear axle. The rear drive wheel is suspended off the underlying support surface, such as the floor, and drives a roller carried on the trainer stand. The roller generally is drivingly connected to a resistance device, and possibly to a flywheel. It is an inconvenient and unwieldy setup and is not needed in today's day and age.

Currently available bikes have electronic torque sensor and electronic speed sensor attached to the e-bikes for determining the torque and speed applied by the user. However, these electronic torque sensors and speed sensors are complex, expensive and inaccurate to be used for professional category fitness functions.

Further, the existing electronic torque and speed sensors are not sensitive enough in determining the torque and speed respectively in real time. Therefore, there is a need of a training system for a user that provides simplicity convenience, accuracy, real time sensitivity by having a brushless gearless hybrid sensing system for commuting and indoor fitness training.

SUMMARY OF THE INVENTION

In accordance with teachings of the present invention, a training system for providing fitness training incorporated in an e-bike is provided.

An object of the present invention is to provide a training system for communicating over a communication network. The training system provides fitness training to a user riding an e-bike. The e-bike includes a frame, a front wheel, and a rear wheel. The training system includes a motor system attached to the rear wheel of the e-bike and a detachable training stand coupled to the rear wheel. The training stand raises the rear wheel from the ground to allow the user to ride in various terrain modes from a stationary position for enhancing body fitness.

The motor system includes a stator assembly, a rotor assembly rotating around the stator assembly, an axle supports the rotor assembly to rotate around the stator assembly, a memory unit configured in the stator assembly to store set of instructions and plurality of terrain modes for riding the e-bike, and a bi-directional communication unit attached the stator assembly for receiving terrain modes and other commands over the communication network.

The motor system further includes a processing unit coupled to the memory unit and configured in the stator assembly. The processing unit processes the set of instructions to: receive the terrain mode for setting the motor system over the communication network through the bi-directional communication unit in real time; and change the motor quadrant of operation in the real time depending upon the received terrain mode.

Another object of the present invention is to provide the motor system with a free-hub assembly attached to the rotor assembly; further the free-hub assembly slides on the axle, a free-hub spacer attached to the free-hub assembly to rotate proportionally with the pedaling speed of the user, free-hub magnets attached to the free-hub spacer to produce a pattern for sensing pedaling speed and pedaling direction and a magnetic sensor configured on the axle for processing the pattern of pedaling speed and pedaling direction received from the free-hub magnets. The processing unit processes the information from the magnetic sensor to derive the power generated by the user during pedaling.

Another object of the present invention is to provide the motor system wherein the free-hub magnets attached to the free-hub spacer further produce a pattern for sensing pedaling speed, pedaling direction and user torque; and further wherein the magnetic sensor derives the pattern of pedaling speed, pedaling direction and pedaling torque received from the free-hub magnets and the free-hub assembly.

Another object of the present invention is to provide a motor system wherein the bi-directional unit communicates the derived power, the derived pattern of pedaling speed, the pedaling direction and the pedaling torque received from the processing unit over the communication network.

Another object of the present invention is to provide the motor system that self-powers the memory unit, the bi-directional communication unit and the processing unit. The self-powering is done by converting the mechanical energy of the user into the electrical energy.

Another object of the present invention is to provide the training system with a frame having a front portion to receive a front wheel and a rear portion to receive a rear wheel, pedals connected to the frame for allowing the user to exert pressure, and a chain to connect pedals with the gears of the motor system.

Another object of the present invention is to provide a touch display unit for receiving commands from the user. Further, the touch display unit displays the processed information received from the processing unit. The memory unit further stores a gaming module that is processed by the processing unit. The gaming module communicates to a virtual reality game through the bi-directional communication unit. The motor quadrant of operation changes depending upon the instructions received from the virtual reality game in real time.

These and other features and advantages will become apparent from the following detailed description of illustrative embodiments thereof, which is to be read in connection with the accompanying drawings.

DETAILED DESCRIPTION OF DRAWINGS

Figure 1:
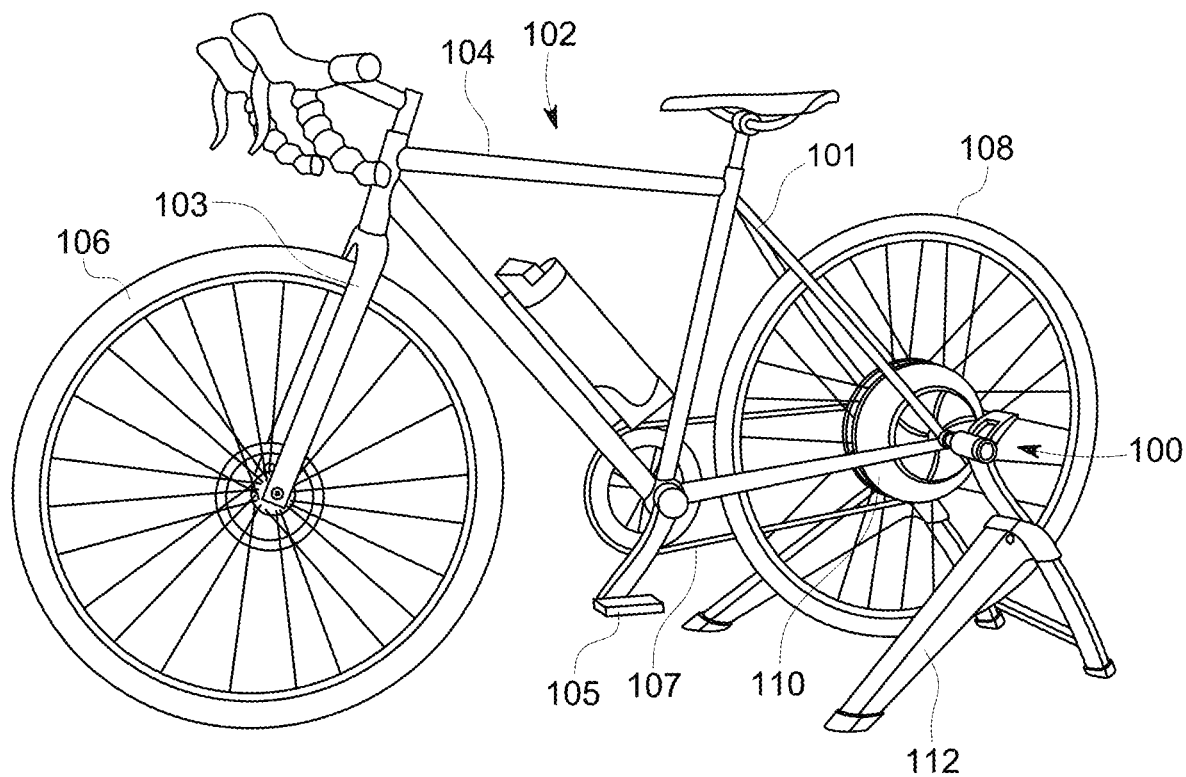
FIG. 1 illustrates a schematic diagram for showing attachment of a training system on an e-bike in accordance with a preferred embodiment of the present invention.

While this technology is illustrated and described in a preferred embodiment, a training system for a user riding an e-bike may be produced in many different shapes, sizes, materials, forms, computer languages and configurations. This is depicted in the drawings, and will herein be described in detail, as a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the technology described herein.

FIG. 1 illustrates a schematic diagram for showing attachment of a training system 100 on an e-bike 102 in accordance with a preferred embodiment of the present invention. The training system 100 communicates over a communication network. The training system 100 provides fitness training to a user riding the e-bike 102. The training system 100 includes a motor system 110 and a detachable training stand 112. In a preferred embodiment of the present invention, the motor system 110 includes a brushless gearless motor.

The e-bike 102 includes a rear portion 101, a front portion 103, a frame 104, pedals 105 connected to the frame 104 for allowing the user to exert pressure, a front wheel 106 attached to the front portion 103, a chain 107 for connecting the pedals 105 with the motor system 110 and a rear wheel 108 attached to the rear portion 101. In another preferred embodiment of the present invention, the motor system 110 includes gears and magnets; and further the chain 107 connects the pedals with the gears of the motor system 110.

The motor system 110 is attached to the rear wheel 108 of the e-bike 102. The motor system 110 is explained in detail in conjunction with FIG. 2 of the present invention. The training stand 112 is detachably coupled to the rear wheel 108. The training stand 112 is explained in detail in conjunction with FIG. 3 of the present invention.

Figure 2:
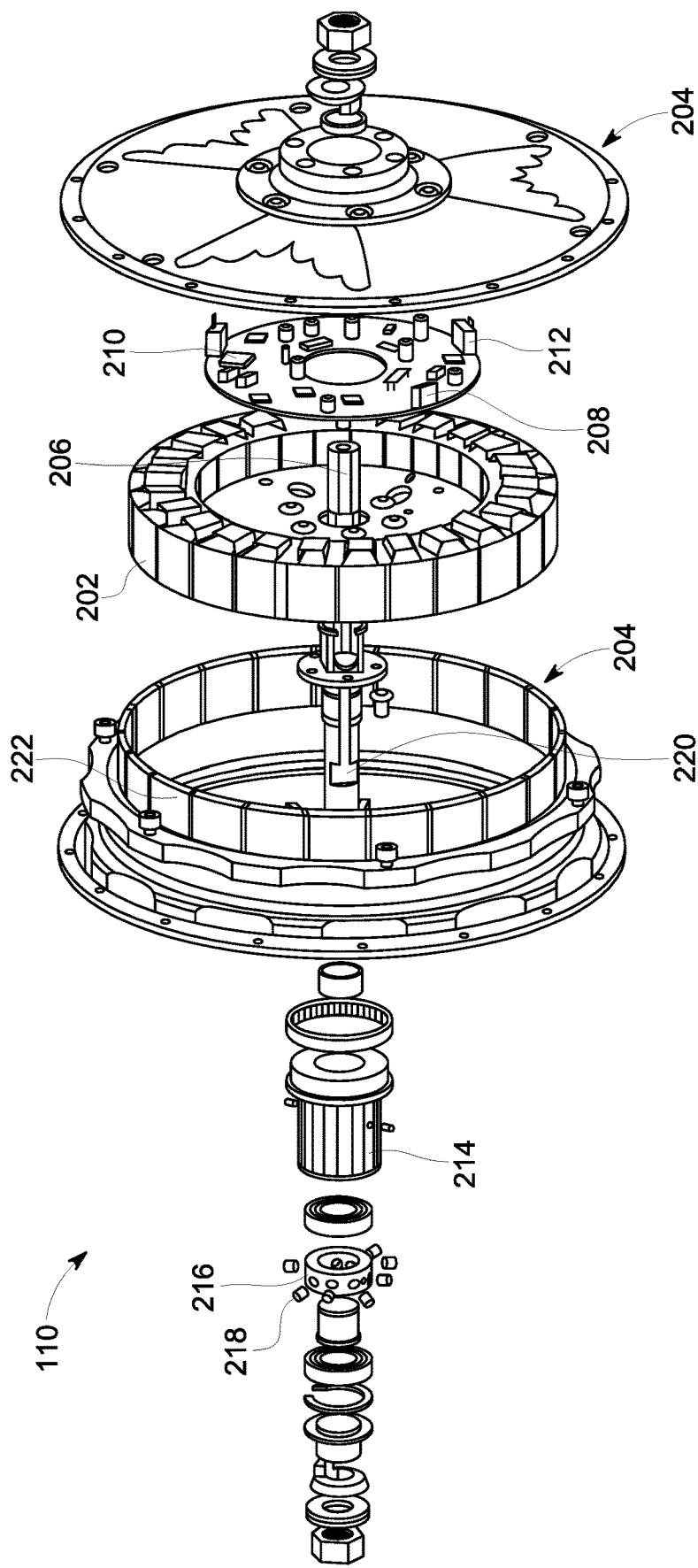
FIG. 2 illustrates an exploded view of a motor system in accordance with a preferred embodiment of the present invention.

FIG. 2 illustrates an exploded view of a motor system 110 in accordance with a preferred embodiment of the present invention. The motor system 110 includes a stator assembly 202, a rotor assembly 204 rotating around the stator assembly 202, and an axle 206 supports the rotor assembly 204 to rotate around the stator assembly 202.

Further, the motor system 110 includes a memory unit 208, a bi-directional communication unit 210, and a processing unit 212. The memory unit 208 is attached to the stator assembly 202 for storing set of instructions and plurality of terrain modes for riding the e-bike. Examples of the memory unit 208 include but not limited to RAM, ROM, flash memory, EEPROM and other similar storage devices.

Examples of terrain mode include but not limited to a hill mode, a beach mode, a city mode, a flat road mode, a forest mode, a trail mode, urban mode, highway mode, a swamp mode, a desert mode etc or a combination of the above modes. These modes have a pre-determined assistance, resistance and other control parameters such as dynamically changing weather provided to the user during riding. The processing unit 212 further simulates road conditions by providing disturbance/vibration to the user as in real life situations on receiving terrain modes over the communication network.

The terrain modes may be received from several possible ways including but not limited to a virtual reality game, wireless remote, control buttons on the e-bike, a smartphone software application, and other similar ways. The processing unit 212 changes the motor quadrant of operation in real time depending upon the received terrain mode.

The bi-directional communication unit 210 is attached to the stator assembly 202 for receiving terrain modes and other commands over the communication network. The processing unit 212 is coupled to the memory unit 208 and configured in the stator assembly 202. Examples of the bi-directional communication unit 210 include but not limited to LAN, Fiber Optics, ANT+, Bluetooth, Internet, NFC, Wi-Fi, and other similar communication devices.

The processing unit 212 processes the set of instructions to receive the terrain mode for setting the motor system 110 over the communication network through the bi-directional communication unit 210 in real time; and to change the motor quadrant of operation depending upon the received terrain mode in the real time. Examples of the processing unit 212 include but not limited to microprocessors, microcontrollers, digital signal processors etc.

The motor quadrant of operation refers to assistance in forward direction or reverse direction, resistance in forward or reverse direction or a combination of the assistance and the resistance to correlate with the road and weather conditions. In another preferred embodiment of the present invention, the motor system 110 further has plurality of magnets 222 used for generating power for the memory unit 208, bi-directional communication unit 210 and the processing unit 212.

In another preferred embodiment of the present invention, the motor system 110 further includes a free-hub assembly 214, a free-hub spacer 216, free-hub magnets 218 and a magnetic sensor 220. The free-hub assembly 214 is attached to the rotor assembly 204 and further slides on the axle 206. The free-hub assembly 214 houses the bike gears.

The free-hub spacer 216 is attached to the free-hub assembly 214 to rotate proportionally with the pedaling speed of the user. The free-hub spacer 216 and the free-hub assembly 214 are made of non-magnetic metals such as aluminum or titanium. Generally, the shape of the free-hub spacer 216 and the free-hub assembly 214 is circular or spherical. The free-hub spacer 216 includes multiple slots on the surface. Preferably, the number of slots is nine.

The free-hub magnets 218 are attached to the free-hub spacer 216 for producing a pattern for sensing pedaling speed and pedaling direction. The free-hub magnets 218 are made of rare earth metals or similar artificial magnetic materials such as ceramics. The free-hub magnets 218 generate magnetic field on rotation. The magnetic sensor 220 processes the pattern of pedaling speed and pedaling direction received from the free-hub magnets 218.

The magnetic sensor 220 is a group of multiple sensors configured on the shaft. Preferably, the number of magnetic sensor 220 is four and is arranged on the shaft. The magnetic sensor 220 is a transducer such as hall sensors, responding to varying magnetic field. The magnetic sensor 220 communicates with the magnetic field generated by the free-hub magnets 218 during rotation. The magnetic sensor 220 senses both forward and reverse direction of pedaling from the user.

The free-hub magnets 218 attached to the free-hub spacer 216 further produce a pattern for sensing pedaling speed, pedaling direction and user torque; and further wherein the magnetic sensor 220 derives the pattern of pedaling speed, pedaling direction and pedaling torque received from the free-hub magnets 218 and the free-hub assembly 214.

For exemplary purposes, the number of free-hub magnets 218 ranges from two to seventy two magnets. Further, each free-hub magnet 218 is separated from other at angle ranging from 5 degrees to 180 degrees. Preferably, the number of free-hub magnets is eight and are further arranged in nine slots of the free-hub spacer 216. The free-hub magnets 218 are multiple of 40 degrees apart from each other.

It would be readily apparent to those skilled in the art that various numbers of slots on the free-hub spacer 216, various number of free-hub magnets attached to the slots and various angles of free-hub magnet 218 from each other may be envisioned without deviating from the scope of the present invention.

The processing unit 212 processes the information from the magnetic sensor 220 to derive the power generated by the user during pedaling. The bi-directional communication unit 210 communicates the derived power, derived pattern of pedaling speed, pedaling direction and pedaling torque received from the processing unit 212 over the communication network.

Figure 3:
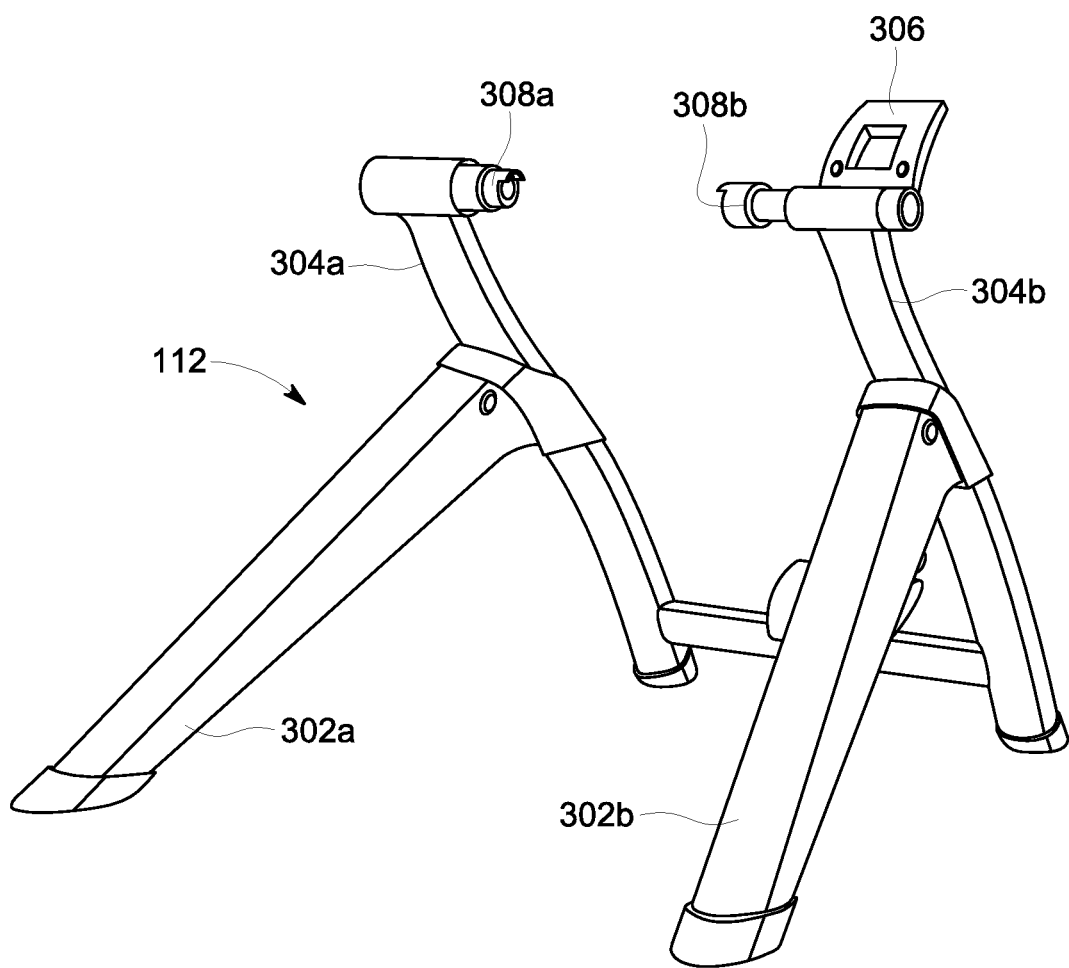
FIG. 3 illustrates a perspective view of a training stand in accordance with a preferred embodiment of the present invention.

FIG. 3 illustrates a perspective view of a training stand 112 in accordance with a preferred embodiment of the present invention. The training stand 112 includes pair of stationary stand legs 302a, 302b, pair of stationary frame 304a, 304b, a lever 306 and pair of jam nuts 308a, 308b.

The stationary stand legs 302a, 302b are placed on the ground and are foldable. The stationary frame 304a extends from the stationary stand leg 302a and the stationary frame 304b extends from the stationary stand leg 302b. The lever 306 extends from the stationary frame 304b to lock the axle (shown in FIG. 2) at a fixed position.

The jam nut 308a and the jam nut 308b are adjustable to hold the axle (shown in FIG. 2) of the motor system (shown in FIG. 2). Further the jam nut 308b is used to assemble the rear wheel (shown in FIG. 1) on the stationary stand 302a, 302b on force applied through the lever 306.

Figure 4:
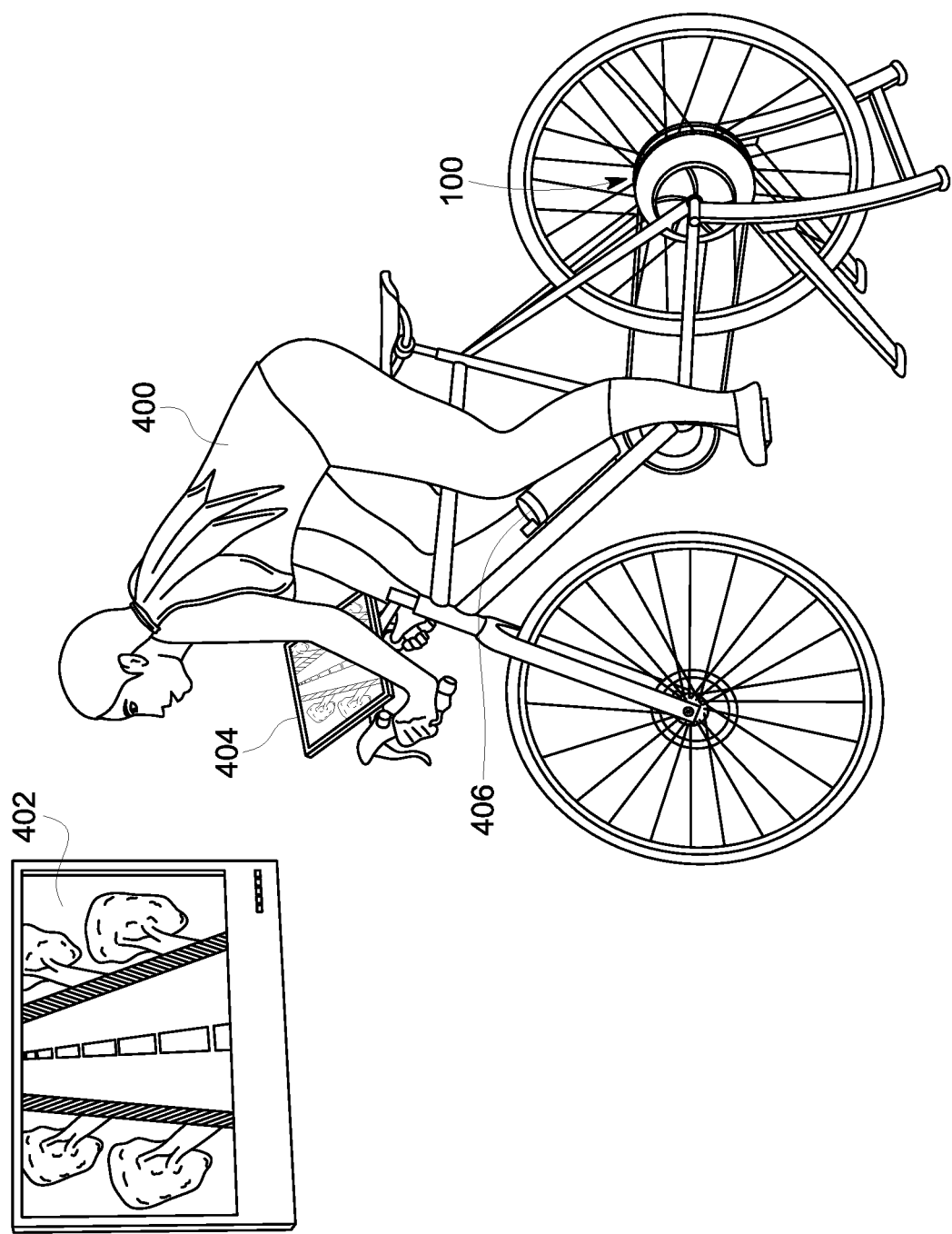
FIG. 4 illustrates a schematic view of showing a user riding the training system while receiving commands from a virtual reality game in accordance with an exemplary embodiment of the present invention.

FIG. 4 illustrates a schematic view of showing a user 400 riding the training system 100 while receiving commands from a virtual reality game 402 in accordance with an exemplary embodiment of the present invention. The training system 100 further includes a touch display unit 404 for displaying the processed information received from the processing unit.

The touch display unit 404 further receives touch commands like the change of terrain mode from the user 400. The processing unit processes the commands to control the quadrant of operation of the motor system 110 as per the received touch commands. Further, the touch commands may relate to other parameters such as total distance covered, total time spend, maps, personal details, software applications and other similar commands. These commands are for informative purposes and thus the user 400 is able to view such stored information on the touch display unit 404.

The training system 100 further includes a gaming module. The gaming module is stored in the memory unit and is processed by the processing unit. The gaming module allows the user 400 to connect with either the virtual reality game 402 or the display unit 404 while riding or through any other communication network.

The processing unit (not shown in FIG. 4) receives command from the virtual reality game 402 or the display unit 404 through the communication network via the bi-directional communication unit. For exemplary purposes, the command received relates to change in mode from hill mode to beach mode. Then, the processing unit (not shown in FIG. 4) changes the quadrant of operation of the motor system 110 as per the instructions received from the virtual reality game 402 or the display unit 404.

In another preferred embodiment of the present invention, the training system 100 further includes a unit 406 for either powering of the memory unit, the processing unit, touch display unit and the bi-directional communication unit or for the purposes of capturing or dissipating re-generative energy generated by the user. Examples of the unit 406 include but not limited to rechargeable battery, resistors or combination of both.

The present invention offers various advantages such as self-powered hybrid sensor that provides power training, heart rate training, virtual reality training, real time training, and versatile training. The training system further provides professional grade fitness training. The training system is able to get connect with the virtual reality game to provide a realistic road feel training, while training indoors. Further, the same training system may further be used while riding outdoors.

Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

The invention claimed is:

1. A training system for communicating over a communication network, the training system for providing fitness training to a user riding an e-bike, the e-bike having a frame, a front wheel and a rear wheel, the training system comprising:
   a motor system attached to the rear wheel of the e-bike, the motor system comprising:
   a stator assembly;
   a rotor assembly rotating around the stator assembly;
   an axle supports the rotor assembly to rotate around the stator assembly;
   a memory unit configured in the stator assembly to store a set of instructions and a plurality of terrain modes for riding the e-bike;
   a bi-directional communication unit attached to the stator assembly for receiving terrain modes and other commands over the communication network;
   a processing unit coupled to the memory unit and configured in the stator assembly, the processing unit processes the set of instructions to:
   receive a selected one of the plurality of terrain mode for setting the motor system over the communication network through the bi-directional communication unit in real time; and
   change the motor quadrant of operation in the real time depending upon the received terrain mode; and
   a detachable training stand coupled to the rear wheel, the training stand raising the rear wheel from the ground to allow the user to ride in various terrain modes from a stationary position for enhancing body fitness.

2. The training system according to claim 1 further comprising a dissipative unit for dissipating or storing user generated energy.

3. The training system according to claim 1 wherein the motor system further comprising:
   a free-hub assembly attached to the rotor assembly; further the free-hub assembly slides on the axle;
   a free-hub spacer attached to the free-hub assembly to rotate proportionally with the pedaling speed of the user;
   free-hub magnets attached to the free-hub spacer to produce a pattern for sensing pedaling speed and pedaling direction; and
   a magnetic sensor configured on the axle for processing the pattern of pedaling speed and pedaling direction received from the free-hub magnets;
   wherein the processing unit processes the information from the magnetic sensor to derive the power generated by the user during pedaling.

4. The training system according to claim 3 wherein the bi-directional communication unit communicates the derived power received from the processing unit over the communication network.

5. The training system according to claim 3 wherein the free-hub magnets attached to the free-hub spacer further produce a pattern for sensing pedaling speed, pedaling direction and user torque; and further wherein the magnetic sensor derives the pattern of pedaling speed, pedaling direction and pedaling torque received from the free-hub magnets and the free-hub assembly.

6. The training system according to claim 5 wherein the bi-directional communication unit further communicates the derived pattern of pedaling speed, the pedaling direction and the pedaling torque received from the processing unit over the communication network.

7. The training system according to claim 1 wherein the motor system self-powers the memory unit, the bi-directional communication unit and the processing unit.

8. A training system for providing fitness training to a user riding an e-bike, the training system for communicating over a communication network, the training system comprising:
   a brushless gearless motor comprising:
   a stator assembly;
   a rotor assembly exteriorly rotating around the stator assembly;
   an axle to support rotation of the rotor assembly around the stator assembly;
   a memory unit configured in the stator assembly to store a set of instructions and a plurality of terrain modes for riding the e-bike;
   a bi-directional communication unit attached to the stator assembly for receiving terrain modes and other commands over the communication network;
   a processing unit coupled to the memory unit and configured in the stator assembly, the processing unit processes the set of instructions to:
   receive a selected one of the plurality of terrain mode for setting the motor system over the communication network through the bi-directional communication unit in real time; and
   change the motor quadrant of operation in the real time depending upon the received terrain mode.

9. The training system according to claim 8 wherein the brushless gearless motor further comprising:
   a free-hub assembly attached to the rotor assembly; further the free-hub assembly slides on the axle;
   a free-hub spacer attached to the free-hub assembly to rotate proportionally with the pedaling speed of the user;
   a free-hub magnets attached to the free-hub spacer to produce a pattern for sensing pedaling speed and pedaling direction; and
   a magnetic sensor configured on the axle for processing the pattern of pedaling speed and pedaling direction received from the free-hub magnets;
   wherein the processing unit processes the information from the magnetic sensor to derive the power generated by the user during pedaling.

10. The training system according to claim 9 wherein the free-hub magnets attached to the free-hub spacer further produce a pattern for sensing pedaling speed, pedaling direction and user torque; and further wherein the magnetic sensor derives the pattern of pedaling speed, pedaling direction and pedaling torque received from the free-hub magnets and the free-hub assembly.

11. The training system according to claim 10 wherein the bi-directional communication unit communicates the derived pattern of pedaling speed, pedaling direction and pedaling torque received from the free-hub magnets over the communication network.

12. The training system according to claim 9 wherein the bi-directional communication unit communicates the derived power received from the processing unit over the communication network.

13. A training system for maintaining fitness of a user, the training system comprising:
- a frame having a front portion and a rear portion;
- pedals connected to the frame for allowing the user to exert pressure;
- a motor system connected to the rear portion of the frame, the motor system having gears;
- a chain to connect the pedals with the gears of the motor system;
- a front wheel attached to the front portion;
- wherein the motor system comprising:
- a stator assembly;
- a rotor assembly rotating around the stator;
- an axle supports the rotor assembly to rotate around the stator assembly;
- a memory unit configured in the stationary assembly to store a set of instructions and a plurality of terrain modes for riding;
- a bi-directional communication unit attached to the stationary assembly for receiving terrain modes and other commands over the communication network;
- a processing unit coupled to the memory unit and configured in the stationary assembly, the processing unit processes the set of instructions to:
  - receive a selected one of the plurality of terrain mode for setting the motor system over the communication network through the bi-directional communication unit in real time; and
  - change the motor quadrant of operation depending upon the received terrain mode in the real time; and
- a detachable training stand coupled to the motor, the training stand raising the rear wheel from the ground to allow the user to ride the e-bike in various terrain modes from a stationary position for enhancing body fitness.

14. The training system according to claim 13 further comprising a touch display unit for receiving commands from the user and further the touch display unit displays the processed information received from the processing unit.

15. The training system according to claim 13 wherein the memory unit further stores a gaming module, and the processing unit processes the gaming module, wherein the gaming module communicates to a virtual reality game through the bi-directional communication unit, wherein the motor quadrant of operation changes depending upon the instructions received from the virtual reality game in real time.

16. The training system according to claim 13 wherein the motor system further comprising:
- a free-hub assembly attached to the rotor assembly; further the free-hub assembly slides on the axle;
- a free-hub spacer attached to the free-hub assembly to rotate proportionally with the pedaling speed of the user;
- a free-hub magnets attached to the free-hub spacer to produce a pattern for sensing pedaling speed and pedaling direction; and
- a magnetic sensor configured on the axle for processing the pattern of pedaling speed and pedaling direction received from the free-hub magnets;

wherein the processing unit processes the information from the magnetic sensor to derive the power generated by the user during pedaling.

17. The training system according to claim 16 the bi-directional communication unit communicates the derived power received from the processing unit over the communication network.

18. The training system according to claim 16 wherein the free-hub magnets attached to the free-hub spacer further produce a pattern for sensing pedaling speed, pedaling direction and user torque; and further wherein the magnetic sensor derives the pattern of pedaling speed, pedaling direction and pedaling torque received from the free-hub magnets and the free-hub assembly.

19. The training system according to claim 18 wherein the bi-directional communication unit further communicates the derived pattern of pedaling speed, pedaling direction and pedaling torque received from the processing unit over the communication network.

20. The training system according to claim 13 further comprising a rear wheel to allow the user to ride a smart e-bike outdoors upon detaching the training stand.

* * * * *